May 28, 1963  C. D. HEMBREE  3,091,438
MOBILE MIXING AND PUMPING APPARATUS
Filed Feb. 10, 1960  3 Sheets-Sheet 1

INVENTOR.
Calvin D. Hembree
BY
ATTORNEYS

May 28, 1963  C. D. HEMBREE  3,091,438
MOBILE MIXING AND PUMPING APPARATUS
Filed Feb. 10, 1960  3 Sheets-Sheet 2

INVENTOR.
Calvin D. Hembree
BY
ATTORNEYS

May 28, 1963   C. D. HEMBREE   3,091,438
MOBILE MIXING AND PUMPING APPARATUS
Filed Feb. 10, 1960   3 Sheets-Sheet 3

INVENTOR.
Calvin D. Hembree
BY
ATTORNEYS

United States Patent Office 3,091,438
Patented May 28, 1963

3,091,438
MOBILE MIXING AND PUMPING APPARATUS
Calvin D. Hembree, 900 S. Jackson St., Denver, Colo.
Filed Feb. 10, 1960, Ser. No. 7,830
16 Claims. (Cl. 259—151)

This invention is directed to mixing and pumping equipment and more particularly to an integral unit for transporting, mixing, and pumping materials for the lining of oil wells.

The use of cement for lining wells appears to have originated abbout 1900 when sand and bags of cement were lowered into a well in an unsuccessful attempt to shut off bottom water. Since that time, the oil-well cementing art has progressed through various stages of equipment and cement development.

Previously, cement was pumped into a well and allowed to set for twelve to fourteen days before being drilled. Such a condition obviously led to the development of materials which would accelerate the setting time of the cement, allow quicker drilling out of the plug and therefore result in savings of time and money.

Many materials were investigated and many salts and other adulterating additives were found to exhibit retarding or accelerating effects on the cement, depending on the material used and the concentration thereof.

Cement having rapid initial set and high early strength appeared to answer the demands of the industry, but with the advent of deeper drilling, other problems arose, such as high formation temperatures. The rapidity with which the cement reached its initial set at high temperature caused considerable difficulty at depths of 6,000 to 7,000 feet. Thus with the trend toward deeper production wells (12,000–15,000 feet) there has arisen the necessity of employment of cementing material capable of a slow setting time, rapid hardening after setting and attainment of enough strength in a relatively short time to allow drilling out of the plug a short time after placement.

With the development of the above materials, there has necessarily arisen the need for new equipment capable of handling and using the above materials effectively in a continuous operation with a minimum of shutdown time due to mechanical failures and the like.

Further, since oil well drilling normally occurs in rather deserted areas removed from population centers, good roads, water supply, and sources of cement materials, and the like, transportation has been a major problem. Thus, the difficulty has been to find an effective way to economically transport unmixed materials, pumps, and related equipment to well drilling sites without contamination of the dry ingredients by moisture, dust and the like. Such contamination has a marked effect on the setting and hardening time as pointed out above regarding the discussion of the materials added to cement to either effect an acceleration or retarding of the hardening characteristics of the cement.

To overcome the foregoing problems, I have invented a mobile, integrated unit for hauling, mixing and pumping well lining materials, which not only carries and protects the equipment which is to be used, but also carries the unmixed lining ingredients protected from the elements. Adidtionally, my integral mobile arrangement supplies the necessary power requirements for mixing of the lining material and high pressure pumping of the mixed cement into a well. The pressure required to pump the mixed cement into a well is as high as 10,000 pounds per square inch, which requires rather large equipment and power requirements.

Briefly, my invention comprises an enclosed mobile bed such as the enclosed bed of a truck, semi- or full trailer, or the like, divided into a novel arrangement of compartments which are interconnected by piping and inclusive of pumps, motors and the like, all of which are protected from the elements. The unit, furthermore, provides a novel arrangement of storage, moving and mixing of the cement into concrete whereby the cement is maintained dry for storage, and aerated and unagglomerated for fast and efficient mixing.

It is therefore among the objects and advantages of this invention to provide a highly mobile, integral system for use in lining wells.

It is a further object to provide an enclosed, integral, mobile, interconnected combination of elements whereby well lining materials may be mixed at the well drilling site under carefully controllable conditions.

It is another object of my invention to provide an integrated unit for hauling, mixing and pumping oil well lining materials.

It is a further specific object of this invention to furnish enclosed, integral, mobile oil well lining equipment for use at a drilling site.

Further objects and advantages will become obvious to those skilled in the art from a study of the description hereafter with reference to the appended exemplary drawings, wherein, FIG. 1 is a side elevation of apparatus according to my invention as assembled at a well site;

Figure 1:
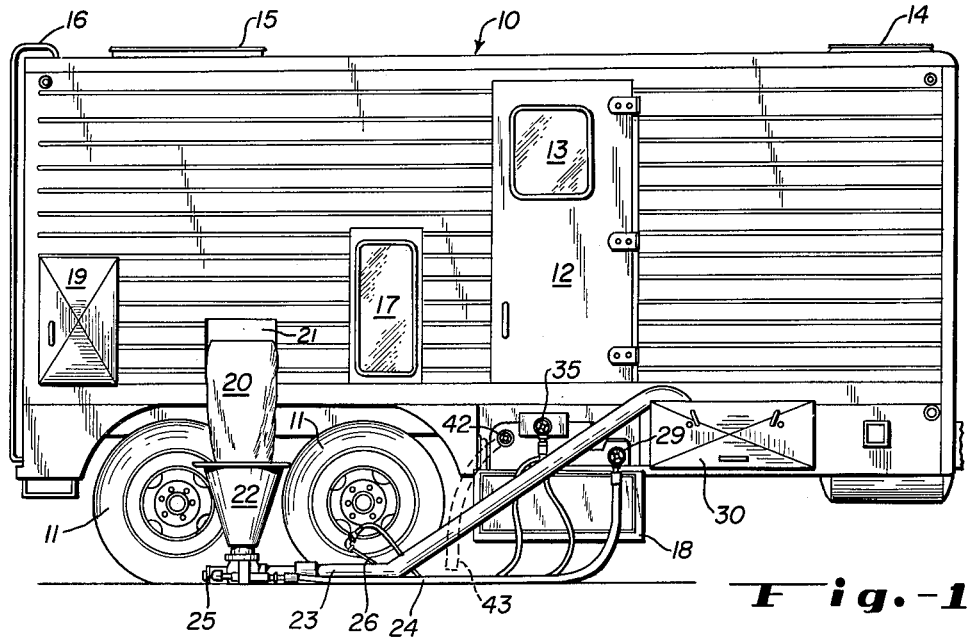

As an exemplary design illustrating one mode of practicing my invention, in FIG. 1 I have shown an insulated enclosed truck bed 10 supported on tandem wheels 11. This is my preferred mobile enclosure. The enclosing panels of the truck may be of any suitable structural material with an insulating material secured to the inner surface, or the structural material being of suitable qualities, as is conventional practice for insulated trucks. Water tanks in the truck are provided with double walls 10a and a double wall top 10b for additional insulation therearound.

Figure 6:
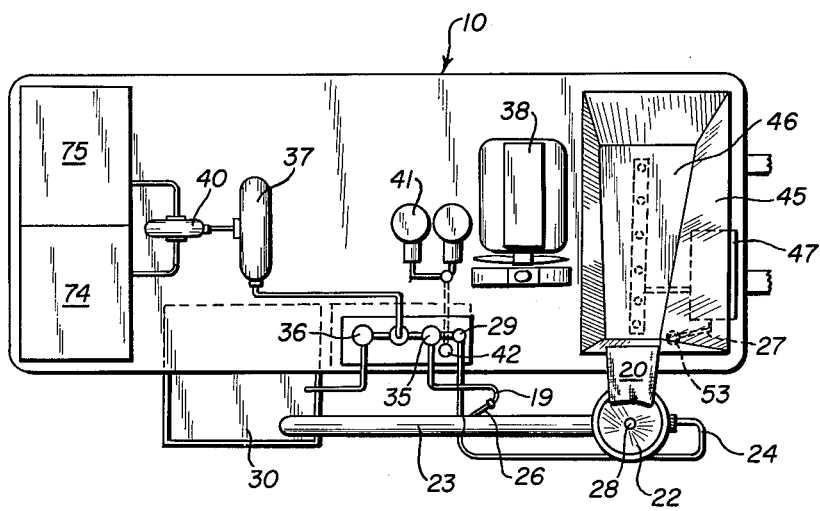
FIG. 6 is a plan schematic sectional view of the device of FIG. 1 in reduced scale.

The truck trailer has a door 12 on each side, although only one is shown in the drawings, each door having a window 13 therein. A ladder 16 is carried on the rear of the truck providing ease of access to the water inlet ports 14 and 14' and the dry cement inlet port 15. A canvas chute 20 connects the cement outlet port 21 to a conical hopper 22 for passing dry cement into the conduit line 23 in a manner which will be described in detail hereafter. Passage of the powdered cement through the conduit line 23 is effected by the passage of a high pressure water jet through the line 24 and the jetting means 25. The water from the jetting means 25 passes under an opening 28 (best shown in FIG. 6) whereby an aspirating effect causes the removal of the dry cement from the conical hopper into the rapidly moving stream of water. As is more clearly shown in FIG. 6, a line 19 connects the valve 35 to another water jetting means 26 thereby supplying additional water to the conduit 23 to accomplish the desired consistency in the cement mix. Thereafter, the cement flows through the conduit 23 into the mixing tub 30. Additional water may be moved by pump 37 through valve 36 and into the mixing tub 30. Passage of water through the valves 35 and 36 is accomplished by the system of pump 37 associated with suitable piping and valves, and the pump 40.

Figure 4:
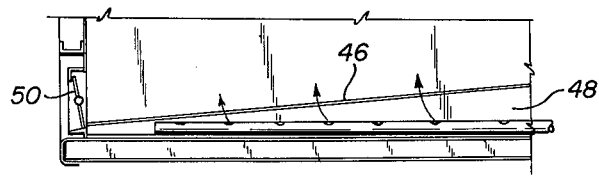
FIG. 4 is a sectional view of a portion of the other end of the device of FIG. 1.
Figure 5:
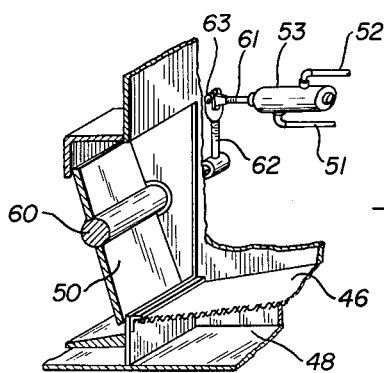
FIG. 5 is an enlarged isometric detail of a portion of the elements of FIG. 4.

The storage bin 45 for the dry cement ingredients has sides sloping to an inclined canvas bottom 46. Situated to the side of the cement bin is a compressor 47. The compressor is arranged to force gas, preferably air, under pressure beneath the canvas bottom 46 (generally into the enclosed area 48) whereby an aerated-agitated condition is maintained in the dry cement ingredients stored in the bin. FIG. 4 shows a detail of the canvas bottom 46 and of the butterfly valve 50 by movement of which dry cement is allowed to pass through the chute 20 into the conical hopper 22. The compressor 47 (referring to FIG. 5) passes air under pressure through the conduits 51 and 52 to a conventional pressure responsive piston 53 whereby the butterfly valve 50 is caused to open and close the aperture leading from the cement bin 45 to the chute 20. The connection between the pressure responsive piston 53 and the axis 60 of the butterfly valve 50 may be such as the piston rod 61 and member 62 at right angles to the axle 60 and connected by the pin 63 whereby air pressure through lines 51 and 52 causes the piston rod 61 to advance or retract thereby pivotally moving the member 62 around the axis 60 causing the butterfly valve to open and close the cement storage bin outlet.

Referring again to FIG. 1, in my preferred embodiment there is an additional side window 17 whereby those working outside the trailer may easily see the operations inside. Also, a door 18 (shown in its closed position in FIG. 2) provides means to enclose and protect the valves from the elements when the device is not in operation. A door 19 provides access to the air compressor 47.

Figure 2:
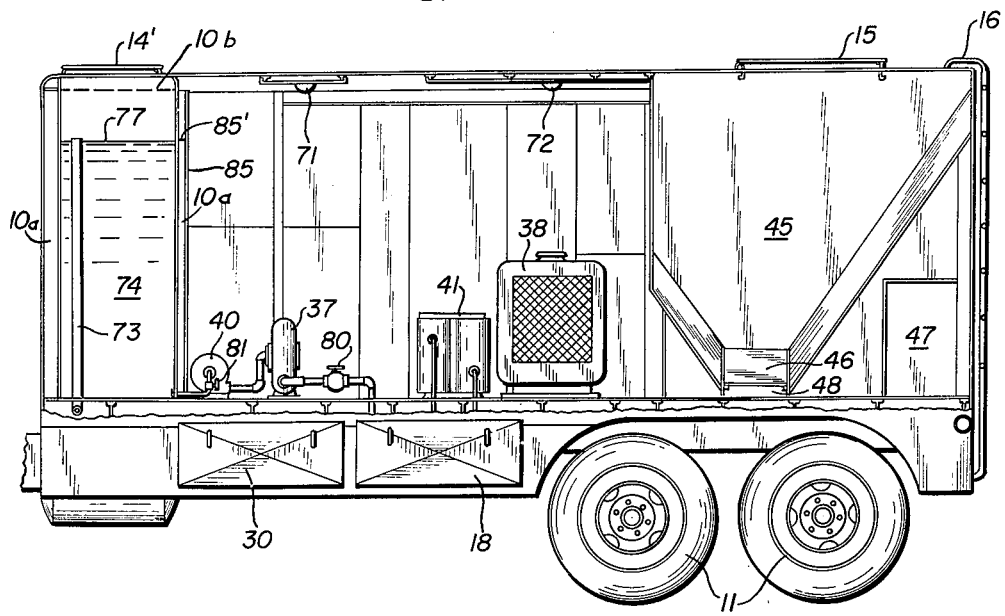
FIG. 2 is a side elevation of the opposite side of the apparatus of FIG. 1 in partial section.
Figure 3:
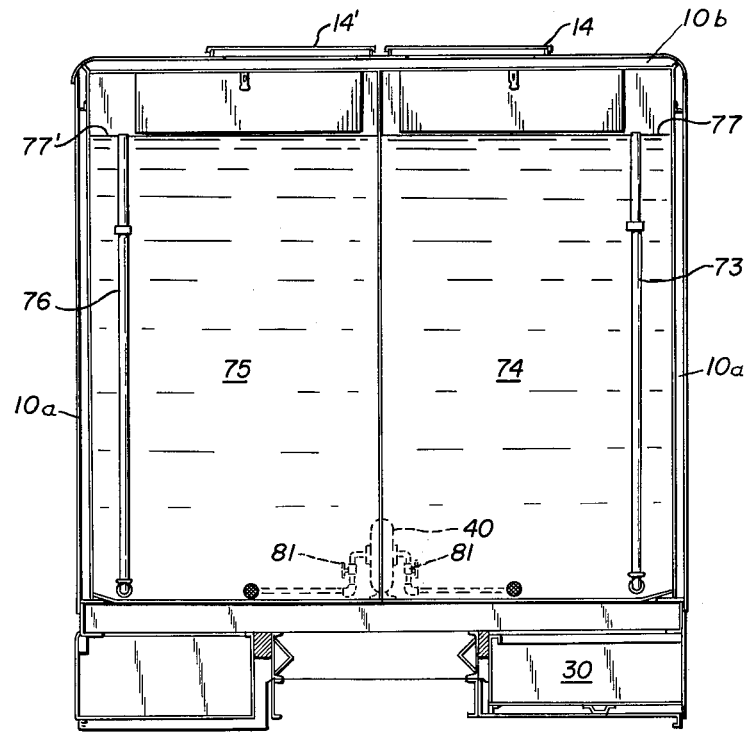
FIG. 3 is an end sectional view of the device of FIG.1.

Referring now to FIG. 2, a prime mover 38, preferably a diesel engine, is mounted inside the trailer to provide the power requirements for the pumps, light fixtures 71 and 72 and the compressor. Additionally, FIG. 2 shows an overflow pipe 73 in the water tank 74. Referring to FIG. 3, the water tank 75 which is juxtaposed next to tank 74 has a similar overflow pipe 76. The water level in the tanks is generally indicated at 77 and 77', respectively, in the tanks 74 and 75.

Referring again to FIGS. 2 and 3, suitable valves 81 may be included in the pipe lines between the water tanks 74 and 75, and the pump 40; and a valve 80 is included in the line between the pump 37 and the mixing tub 30, respectively, to thereby provide better control of the water withdrawn from the tanks 74 and 75. A water level indicator 85 is positioned outside the tanks whereby the water level in the tanks may be easily ascertained from a reading of the level as is generally indicated in FIG. 2 at 85'.

A piston pump 41 is positioned on the vehicle bed for pumping the mixed cement-water mixture from the mixing tub 30 into the well being drilled (not shown) through suitable conduit means attached to the outlet 42. The conduit means is generally indicated in dotted lines in FIG. 1 and is designated by reference character 43.

*Operation*

Figure 7:
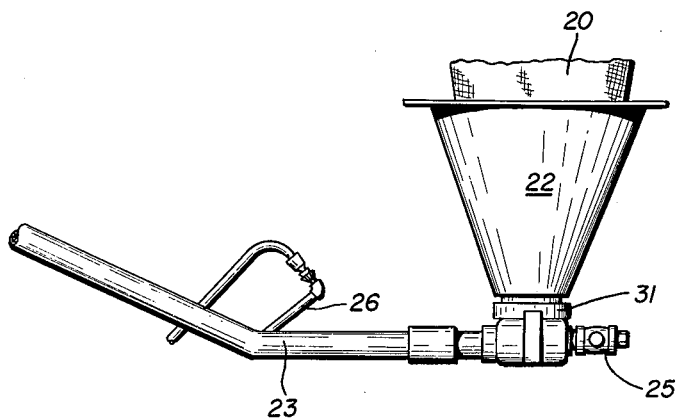
FIG. 7 is an enlarged detail of a portion of the apparatus of FIG. 1.

In operation, a mobile, interal device according to this invention is driven to a position in close proximity to a well being drilled. Thereupon the apparatus generally shown in FIG. 7 is removed from the interior of the truck and placed upon the ground such that the conical hopper 22 is disposed beneath the opening 21 whereby the flexible conduit means 20 connects the opening 21 of the cement bin to the hopper 22. The base of the container 22 is connected to the conduit means 23 by a suitable connection such as threaded nut 26, and the other end of the conduit is led into the mixing tub 30. A water conduit leading to the jetting means 25 is connected through the valve 29. A similar valve 35 supplies the water through a conduit into the jetting means 25. A third valve 36 is connected to the water supply to allow supply of water to the mixing tub 30 as necessary during the operation and for cleaning out the tub after use.

The compressor causes aeration of the cement contained in the container 45 by passage of air through the canvas 46. Under normal operating conditions, the compressor 47 is allowed to operate continuously, thereby assuring an aerated-agitated dry condition in the cement contained in the bin. Further, the bin is moisture tight thereby preventing undesired agglomeration of dry ingredients. A valve (not shown) attached to the lines 51 or 52 is opened causing movement of the butterfly valve 50 and the opening of the outlet from the cement bin 46 allowing dry cement to pass through the conduit 20 into the hopper 22. Thereafter, the valve 29 is opened causing water under pressure to pass through the line 24 beneath the opening 28 of the hopper 22 thus aspirating dry powdered cement into the conduit 23. Commensurate with the opening of the valve 29, the pumps 40 and 37 are started causing water under pressure to arrive at the valves 29, 35 and 36. Commensurate with the opening of valve 29 and the aspiration of the powdered cement into the conduit 23, the valve 35 is opened jetting water into the slurry passing therethrough and thereby accomplishing the desired consistency of cement, as well as adding impetus to the slurry in the conduit 23. Additional water, depending on the consistency desired, may be caused to pass through the valve 36 into the mixing tub 30 when necessary.

As the cement-water mixture issues from the conduit means 23 into the mixing tub 30, the mixing thereof is substantially accomplished and it is possible for the piston pump 41 to substantially continuously remove mixed cement-water for delivery through the conduit line 43 into the well being drilled.

It is desired that it be understood that the foregoing description is examplary only and I do not desire to be limited thereto but rather by the scope of the appended claims.

I claim:

1. In mobile mixing and pumping apparatus, an enclosure, at least one liquid storage container mounted in the enclosure, at least one storage bin for dry ingredients also mounted in the enclosure having a bottom closure which is permeable to gaseous flow, means mounted in said enclosure operatively interconnected beneath the enclosure and adapted to force a gaseous flow through said permeable bottom closure to thereby maintain dry ingredients in a dry, aerated condition preventing agglomeration, a mixer inclusive of first conduit means operatively interconnected with said liquid storage container and adapted for liquid removal from said liquid storage container and for moving conducted liquid in aspirating relation to a second dry ingredients conduit means of the mixer which is in conductive relation with the storage bin, third conduit means opening from said mixer adapted to conduct a mixture of dry ingredients and liquid from the point of aspirating relation to a mixing receptacle carried by the mobile apparatus, means opening from the mixing receptacle and adapted to conduct said slurry to a well to be lined, and a prime mover in driving interconnection with pumping means operatively interconnected with the first, second and third conduits for inducing the flow of liquid, dry ingredient discharge and the resulting slurry and said aerating gaseous flow.

2. In mobile mixing and pumping apparatus, a temperature insulated enclosure, at least one liquid storage container mounted in the enclosure, at least one vertically disposed storage bin for dry ingredients also mounted in the enclosure having a bottom closure which is permeable to gaseous flow, means mounted in said enclosure operatively interconnected beneath the enclosure and adapted to force a gaseous flow through said permeable bottom closure to thereby maintain dry ingredients in a dry, aerated condition preventing agglomeration, a mixer inclusive of first conduit means operatively interconnected with said liquid storage container and adapted for liquid removal from said liquid storage container and for moving conducted liquid in aspirating relation to a second dry ingredients conduit means in conductive relation between the mixer and the storage bin, third conduit means opening from said mixer adapted to conduct a mixture of dry ingredients and liquid from the point of aspirating relation to a mixing receptacle mounted on said mobile apparatus therein to form a slurry opening from the mixing receptacle adapted to conduit said slurry to a well to be lined, and a prime mover in driving interconnection with pumping means operatively interconnected with the first, second and third conduits for inducing the flow of liquid, dry ingredient discharge and the resulting slurry and said aerating gaseous flow.

3. In mobile mixing and pumping apparatus, a temperature insulated enclosure, at least one liquid storage container mounted in the enclosure, at least one vertically disposed storage bin for dry ingredients also mounted in the enclosure having sides sloping from the top to an inclined bottom, and a closure for said bottom which is permeable to gaseous flow, means in said enclosure interconnected with the enclosure for said bottom and adapted to force a gaseous flow through said permeable bottom closure to thereby maintain dry ingredients in a dry, aerated condition preventing agglomeration, a mixer inclusive of first conduit means operatively interconnected with the liquid storage container and adapted for liquid removal from said liquid storage container and for moving conducted liquid in aspirating relation to a second dry ingredients conduit means operatively interconnected with said mixer and in conductive relation with the dry storage bin for moving the dry ingredients from said bin to said mixer, third conduit means operatively interconnected with said mixer and adapted for conducting a mixture of dry ingredients and liquid from the point of aspirating relation to a mixing receptacle carried by the mobile apparatus therein to form a slurry, means conductively interconnected with said mixing receptacle and adapted for conducting said slurry to a well to be lined, and a prime mover in driving interconnection with pumping means operatively interconnected with the first, second and third conduits for inducing the flow of liquid, dry ingredient discharge and the resulting slurry and said aerating gaseous flow.

4. In mobile mixing and pumping apparatus, an enclosure, at least one water storage container mounted in the enclosure, at least one storage bin mounted for dry cement in the enclosure having a bottom closure which is permeable to gaseous flow, means in said enclosure operatively interconnected to open beneath the permeable bottom closure adapted to force a gaseous flow through said permeable closure to thereby maintain dry cement in a dry, aerated condition preventing agglomeration, a mixer inclusive of first conduit means operatively interconnected with said liquid storage container and adapted for water removal from said water storage container and for moving conducted water in aspirating relation to a dry cement conduit means which is interconnected in conductive relation to the storage bin, third conduit means opening from said mixer adapted for conducting a mixture of dry cement and water from the point of aspirating relation to a mixing receptacle carried by the mobile apparatus therein to form slurry, means opening from the mixing receptacle adapted for conducting the slurry to a well to be lined, and a prime mover in driving interconnection with pumping means operatively interconnected with the first, second and third conduits for inducing the flow of water, dry cement discharge and the resulting slurry and said aerating gaseous flow.

5. In a mobile mixing and pumping apparatus, a temperature insulated enclosure, at least one water storage container mounted in the enclosure, at least one vertically disposed storage bin for dry cement also mounted in the enclosure having a bottom closure which is permeable to gaseous flow, means mounted in said enclosure operatively interconnected with the storage bin and adapted to force a gaseous flow through said permeable closure to thereby maintain dry cement in a dry, aerated condition preventing agglomeration, a mixer inclusive of first conduit means adapted for water removal from said water storage container and for moving conducted water in aspirating relation to a dry cement conduit means in conductive interconnection between the storage bin and the mixer, third conduit means opening from said mixer for conducting a mixture of dry cement and water from the point of aspirating relation to a mixing receptacle carried by the mobile apparatus therein to form a slurry, means opening from said mixing receptacle for conducting the slurry to a well to be lined, and a prime mover in driving interconnection with pumping means operatively interconnected with the first, second and third conduits for inducing the flow of water, dry cement discharge and the resulting slurry and said aerating gaseous flow.

6. In mobile mixing and pumping apparatus, an enclosure, at least one liquid storage container in the enclosure, at least one storage bin for dry ingredients in the enclosure having an inclined bottom permeable to gaseous flow, means in said enclosure adapted to force a gaseous flow through said permeable bottom to thereby maintain dry ingredients in a dry, aerated condition for preventing agglomeration, a mixing system adapted to be positioned in the enclosure when the apparatus is in an inoperative condition and movable outside the enclosure for operation, inclusive of first conduit means opening from the liquid storage container and adapted to move liquid from said liquid storage container in an aspirating relation to a dry ingredient conduit means in conductive relation between the dry ingredients bin when the apparatus is in operation, third conduit means adapted to conduct a mixture of dry ingredients and liquid from the point of aspirating relation to a mixing receptacle carried by the mobile apparatus therein to form a slurry, means adapted to conduct the slurry from said receptacle to a well to be lined, and a prime mover in driving interconnection with pumping means operatively interconnected with the first, second and third conduits and the storage bin in the enclosure arranged for inducing flow of liquid, slurry, dry ingredients and gas during operation.

7. The apparatus of claim 6 in which the mixing receptacle is slidable into and out of the apparatus.

8. The apparatus of claim 6 in which the mixing receptacle is a water tight drawer-like member mounted for movement into and out of the enclosure.

9. In mobile mixing and pumping apparatus, an enclosure, at least one liquid storage container in the enclosure, at least one storage bin for dry ingredients in the enclosure having sides sloping from the top to an inclined bottom which is permeable to gaseous flow, means in said enclosure adapted to force a gaseous flow through said permeable closure to thereby maintain dry ingredients in a dry, aerated condition for preventing agglomeration, a mixing system adapted to be positioned in the enclosure when the apparatus is in an inoperative condition and movable outside the enclosure for operation, inclusive of first conduit means adapted to conduct and move liquid from said liquid storage container in an aspirating relation to a dry ingredient conduit means in conductive relation with the dry ingredients storage bin when the apparatus is in operation, third conduit means adapted to conduct a mixture of dry ingredients and liquid from the point of an aspirating relation to a mixing receptacle carried by the mobile apparatus therein to form a slurry, means interconnected between the mixing receptacle and a well to be lined and adapted to conduct the slurry to a well to be lined, and a prime mover in driving intercontection with pumping means operatively interconnected with the first, second and third conduits and the storage bin in the enclosure arranged for inducing flow of liquid, slurry, dry ingredients and gas during operation.

10. Integral mixing and pumping apparatus comprising an enclosed mobile bed, a plurality of separate liquid tight compartments in said enclosure, inclusive of a bin for dry ingredients, at least one fluid tight compartment for water and a mixing compartment for the dry ingredients and the water, conduit means adapted to pass materials from the dry ingredient compartment and the fluid tight compartment into an aspirating relation whereby dry ingredients are aspirated into the water thereby forming a slurry, conduit means adapted to direct the slurry to said mixing compartment, means adapted to maintain the dry ingredients in an aerated non-agglomerated condition, and prime mover means in driving interconnection with pumping means operatively interconnected with the first, second and third conduits and the storage bin for selectively inducing flow through all of said conduits.

11. Integral mixing and pumping apparatus comprising an enclosed mobile bed, a plurality of separate liquid tight compartments in said enclosure, inclusive of a bin for dry ingredients having a sloping bottom permeable to the flow of air, at least one fluid tight compartment for water and a mixing compartment for the dry ingredients and the water, conduit means adapted to pass materials from the dry ingredient compartment and the fluid tight compartment into an aspirating relation whereby dry ingredients are aspirated into the water thereby forming a slurry, conduit means for directing the slurry to said mixing compartment, means adapted to induce air flow through said permeable bottom to maintain the dry ingredients in an aerated non-agglomerated condition, and prime mover means in driving interconnection with pumping means operatively interconnected with the first, second and third conduits and the storage bin for selectively inducing flow through oll of said conduits.

12. Integral mixing and pumping apparatus comprising an enclosed mobile bed, a plurality of separate liquid tight compartments in said enclosure, inclusive of a bin for dry ingredients having side walls sloping to an inclined bottom and a closure therefor permeable to the flow of air, at least one fluid tight compartment for water and a mixing compartment for the dry ingredients and the water, conduit means adapted to pass materials from the dry ingredient compartment and the fluid tight compartment into an aspirating relation whereby dry ingredients are aspirated into the water thereby forming a slurry, conduit means adapted to direct the slurry to said mixing compartment, and prime mover means in driving interconnection with pumping means operatively interconnected with the first, second and third conduits and the storage bin for selectively inducing flow through all of said conduits.

13. In mobile mixing and pumping apparatus, a temperature insulated enclosure containing at least one liquid storage container and a storage bin for dry ingredients, said bin being of substantial vertical depth and having a bottom formed from an air-permeable material and inclined toward an outlet, means for moving air through said bottom into said bin for preventing agglomeration of the stored contents, and mixing means inclusive of conduit means interconnected, one each, from the liquid container and from the storage bin to said mixing means.

14. In mobile mixing and pumping apparatus, a temperature insulated enclosure containing at least one liquid storage container and a storage bin for dry ingredients, said bin being of substantial vertical depth and having a bottom formed from an air-permeable material and inclined toward an outlet, a one-way valve in said outlet for controlling discharge of dry ingredients, means for moving air through said bottom into said bin for preventing agglomeration of the stored contents, and mixing means inclusive of conduit means interconnected, one each, from the liquid container and from the storage bin to said mixing means.

15. In mobile mixing and pumping apparatus, a temperature insulated enclosure containing at least one liquid storage container and a storage bin for dry ingredients, said bin being of substantial vertical depth and having sides sloping inwardly from the top to a bottom formed from an air-permeable material and inclined toward an outlet, a one-way valve in said outlet for controlling discharge of dry ingredients, means for moving air through said bottom into said bin for preventing agglomeration of the stored contents, and mixing means inclusive of conduit means interconnected, one each, from the liquid container and from the storage bin to said mixing means.

16. Integral mixing and pumping equipment comprising a mobile enclosure, a plurality of separate compartments in said enclosure, inclusive of a bin for dry ingredients, at least one fluid tight compartment for water, and a mixing compartment for the dry ingredients and the water, conduit means interconnected between the respective dry ingredients bin, water compartment and mixing compartment adapted to conduct a fluid stream from the fluid tight compartment and aspirate materials from the dry ingredient compartment into said stream, said conduit means adapted to be positioned in the enclosure when inactive and movable to a point outside said enclosure for use, and means in said enclosure adapted to maintain the dry ingredients stored in said bin in an aerated non-agglomerated condition.

References Cited in the file of this patent
UNITED STATES PATENTS

| | | |
|---|---|---|
| 1,541,352 | Halliburton | June 9, 1925 |
| 1,646,582 | Halliburton | Oct. 25, 1927 |
| 1,755,437 | Fazio | Apr. 22, 1930 |
| 1,967,097 | McCrery | July 17, 1934 |
| 2,390,882 | Hopkins | Dec. 11, 1945 |
| 2,552,763 | Baumann | May 15, 1951 |
| 2,677,571 | Williams | May 4, 1954 |
| 2,745,360 | Lunde | May 15, 1956 |
| 2,813,702 | Thomas | Nov. 19, 1957 |
| 2,862,758 | Robertson | Dec. 2, 1958 |